March 9, 1965     D. B. DOOLITTLE     3,172,625
ARRESTING GEAR AND RETRIEVE SYSTEM
Filed March 5, 1962     6 Sheets-Sheet 1
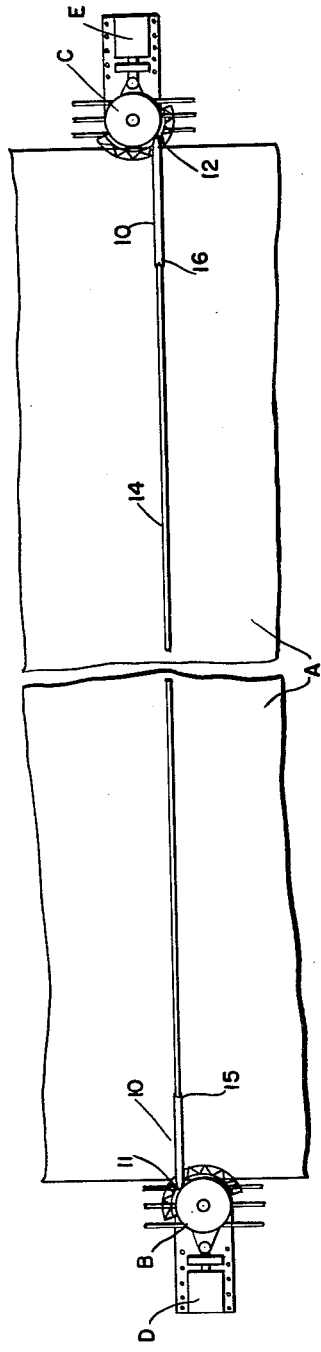
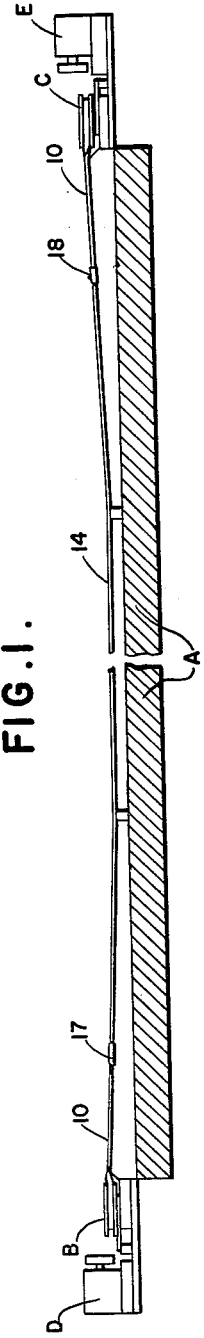
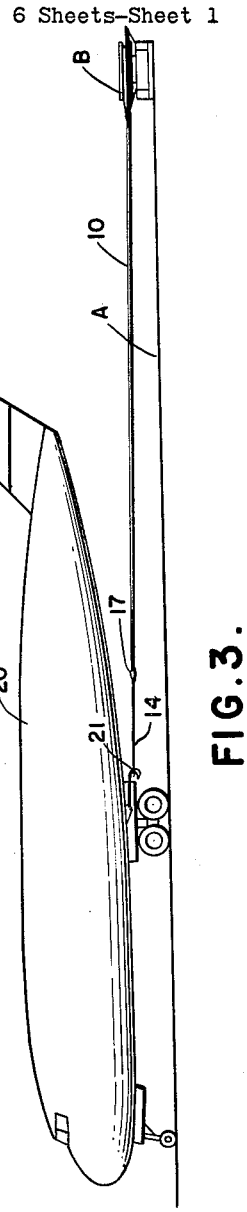
INVENTOR
Donald B. Doolittle
BY *Herbert M. Birch*
ATTORNEY INVENTOR
Donald B. Doolittle BY Herbert M. Birch
ATTORNEY INVENTOR
Donald B. Doolittle INVENTOR
Donald B. Doolittle March 9, 1965   D. B. DOOLITTLE   3,172,625
ARRESTING GEAR AND RETRIEVE SYSTEM
Filed March 5, 1962   6 Sheets-Sheet 5

INVENTOR
Donald B. Doolittle

BY Herbert M. Birch
ATTORNEY

United States Patent Office 3,172,625
Patented Mar. 9, 1965

3,172,625
ARRESTING GEAR AND RETRIEVE SYSTEM
Donald B. Doolittle, Wilmington, Del., assignor to All American Engineering Company, Wilmington, Del., a corporation of Delaware
Filed Mar. 5, 1962, Ser. No. 177,493
16 Claims. (Cl. 244—110)

The present invention relates generally to an energy absorber and more particularly to arresting means for installation on and adjacent landing surfaces for decelerating and arresting the forward motion of aircraft.

An object of this invention is to provide an expeditionary energy absorber of simple design and construction adaptable for aircraft deceleration and arrestment whereever and when ever required, wherein prior required runway or deck sheaves or the like are eliminated.

Another object is to provide a novel energy absorber using a rotary fluid brake means and a tape attached drum in combination with a novel tape retrieve and pretensioning means for the reeving and payout of the tape during use.

Still another object is to provide a programmed tape for use with an energy absorbing device having a tape drum and a rotor type water brake with a shaft from the rotor to which said drum is keyed for rotation therewith.

Yet another object is to provide a hydraulic rotor arrangement adapted to develop, maintain and transmit a constant torque to the tape drum during operative payout of the tape.

Another object is to provide a novel energy absorber, whereby variable performance characteristics are controllable for various ranges of aircraft weights and engaging velocities to be encountered during use.

Yet another object is to provide variable performance characteristics of the energy absorber by control of the tape thickness and the radius of the wrapped tape as it pays out from the tape drum core.

The above and other objects and advantages of the present invention will appear more fully hereinafter from a consideration of the detailed description which follows, taken with the accompanying drawings wherein several features and embodiments thereof are illustrated. It is to be expressly understood, however, that the drawings are for the purpose of illustration only and are not intended as a definition of the limits of the invention.

In the drawings, wherein like reference characters refer to like parts throughout the several views:

FIGURE 1 is a top plan view of the present invention installed adjacent each opposite edge of a landing surface, showing the energy absorbers with a partially extended tape, which tape ends are joined together at a predetermined tension by an aircraft arresting cable or deck pendant;

FIGURE 2 is a vertical cross section view of the landing surface of FIGURE 1 and a side elevation view of the arresting cable, tape connections and the energy absorbers of FIGURE 1;

FIGURE 3 is a semi-schematic side view of an aircraft with its arrest hook engaged with the arrest cable or deck pendant and showing the tapes partially in payout position;

Figure 4:
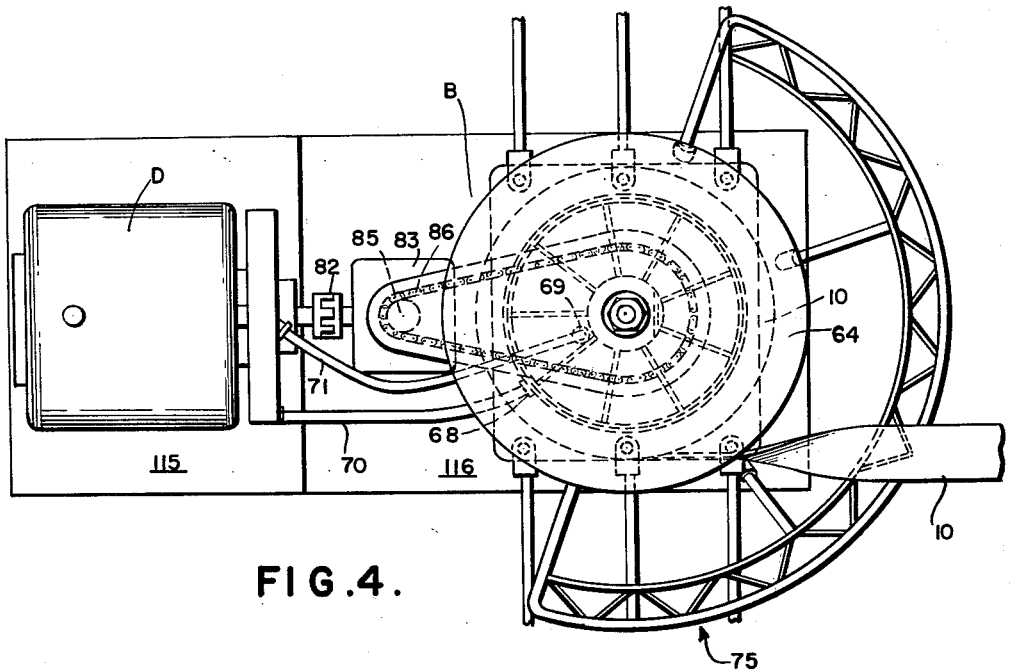
FIGURE 4 is a top plan view of one of the present invention energy absorbers, showing the rotor member in dotted lines as it is mounted in the fluid housing therefor, below the tape storage drum.

Referring to the drawings and first with particular reference to FIGURES 1 through 3 inclusive, there is shown a landing surface A having the present invention novel energy absorber means B and C with operatively associated retrieve means D and E respectively, mounted in slightly offset relation with respect to each other on opposite adjacent sides of the surface A. The offset relation is arranged to provide for a straightline payoff of the energy absorber tape 10 from each unit at diametrically opposite tangential tape payout points 11 and 12, respectively. These oppositely positioned tangential payout points permit a substantially straight-line stretch or extension of the arrest cable 14 between the tape ends 15 and 16 of each respective absorber unit.

These tape ends and the opposite ends of arrest cable are suitably coupled together by means, such as swivelled snap hooks 17 and 18 or the like. Also, the arrest cable, before each arrest, is supported by any well-known cable support means, such for example as in Patent Number 3,010,683 for Integral Cable Supports, owned by the present assignee of this invention, namely, All-American Engineering Company of Wilmington, Delaware.

Since each energy absorber B and C of the first embodiment mounted on each side of the landing surface A is identical in construction to the other, except for the diametrically opposite tangential payout points shown in FIGURE 1, a description in detail of only one of said energy absorbers is necessary. Also, by using two absorbers on each side of a landing surface all cross over pulley means are eliminated and the deck pendant extends across the runway directly from each tape end.

The offset diametrically opposed tangential payout of the tape 10 from the tape storage drums of the units B and C provides for highly efficient bi-directional use to arrest an aircraft 20, such as shown in FIGURE 3, with the arrest hook 21 thereof engaged with the arrest cable 14.

Each energy absorber means is comprised of three basic component assemblies, namely; the energy absorber mechanism A or B, the tape retrieve and pretensioning mechanism D and E and the respective mounting bases and anchoring means therefor. These three component parts are hereinafter, described in detail under their respective headings.

*The energy absorber mechanism*

The energy absorber of embodiment one as illustrated in FIGURES 4 through 8 includes a housing 22. This housing is formed from a drum-shaped container 23, the bottom 24 of which container is formed with a plurality of radial upstanding stator blades 25, see FIGURE 6. The container 23 is formed around the top peripheral rim thereof with an outwardly projecting annular flange 27. The flange 27 is formed with fastener openings 28 for alignment with complementary fastener openings 30 in the annular flange 29 of an annular cover plate 31 for suitable fasteners 33. The cover plate 31 has an annular skirt 34 depending from the flange 29 at right-angles and forms the peripheral base of triangular or inwardly tapered stator blades 35 formed from the underside of the cover plate.

When the cover plate is in position with the opposed flange surfaces engaged, the outer circumferential surface of the cover plate skirt 34 frictionally fits against the inner top surface of the container below the flange. Said flange serves as a guide and as a reinforcing ring for the stator blades 35. To further seal the cover plate in fluid tight connection, an annular gasket 36 is clamped between the flanges 27 and 29.

The bottom 24 of the container is concentrically formed with a bore 37 to provide a bearing mount opening to mount a lower bearing assembly 38. The plate cover is also concentrically formed with a bore 40 to provide a bearing mount opening for an upper bearing assembly 41 to rotatably support the main shaft 42 and a keyed or splined rotor 43 with matching tapered rotor blades 44 and 45 formed from each respective face of the rotor. The rotor is keyed to the main shaft by key means 46.

The rotor blades 44 and 45 extend between the top and bottom stator blades 25 and 35. Each adjacent rotor blade is oppositely tapered with respect to its next adjacent matching tapered stator blade and the respective edges of each opposite rotor and stator blade are slightly spaced apart to permit free rotation of the rotor between the fixed stator blades. There are an uneven number of rotor blades with respect to the number of said stator blades, whereby the beat effect is thereby minimized. For example, there may be a group of eight stator blades opposite to a group of nine rotor blades, or vice versa.

The lower bearing 38 is sealed by a lower plate 47 and an upper oil seal 48 in the bore 37. This bearing seal plate 47 is secured to the container bottom plate 24 by bolts 48. The upper bearing 41 is supported between upper and lower plates 50 and 51, respectively, which are secured by bolts 52 and 53 on the cover plate 31. These plates are formed with aligned openings sealed around the shaft 42 by superimposed upper and lower oil seals 54 and 55.

The main rotor shaft 42 extends through the container 24 in the bearing mountings and then is formed with a conical extended hub 57. The tip of the end of hub 57 is formed with exterior threads 58 for threadedly receiving a retainer nut 59. Keyed onto the hub 57 by key members 60 is a tape storage drum 61, see FIGURE 7.

The tape reel or storage drum has an end of the tape 10 anchored to it by a bolted supplementary core means adjacent a flat side surface of the tape storage drum, around which supplementary core means the tape 10 is looped and secured by staples or stitches 63. Thus the arresting tape 10 is anchored to the said core means 62 of the tape reel or storage drum so that withdrawal by unwinding of tape from around the core of the drum causes the main shaft and the rotor to revolve.

The tape is readily replaceable by withdrawal of bolt means 62ª, whereby various tape designs may be used to control payout operation and for worn tape replacement.

The tape reel or storage drum 61 comprises the said core means 62 and spaced disk members 64 and 65 secured to the top and bottom ends of the said drum 61 by threaded fastener 66. These plates of the tape drum may be made of aluminum to provide for lighter weight and to facilitate replacement or interchange and transport of the tape drums from the main rotor shaft 42. For example, to control various conditions of arrest operation the tape 10 may be programmed, by shaping or by progressively varying its thickness and pay off radius, to thereby control the velocity of payout of the tape when pulled by the arrest hook engaged arrest cable of landing aircraft and to thereby maintain a constant torque from the rotor.

The housing 22 of the energy absorber unit is maintained filled with energy absorbing fluid. This fluid may be varied, for example, various high or low temperature, high or low density fluid may be used as predetermined to vary the capabilities of the unit.

Figure 5:
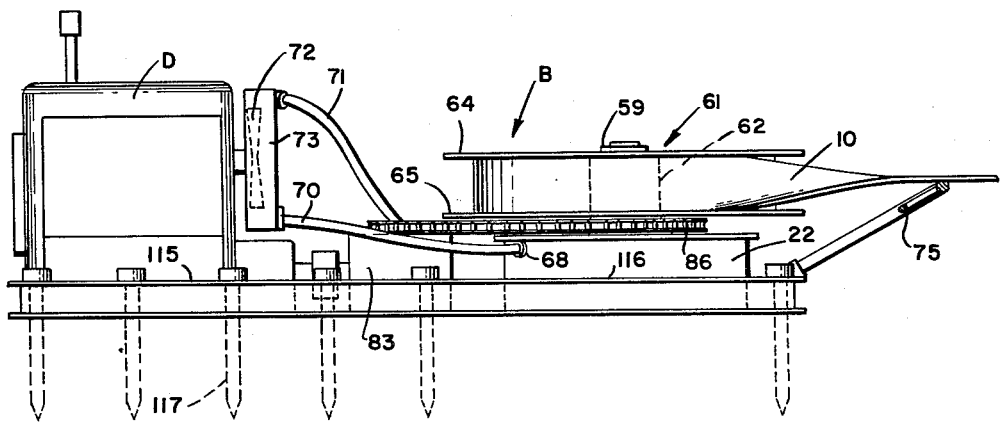
FIGURE 5 is a side elevation view of the energy absorber illustrated in FIGURE 4.
Figure 6:
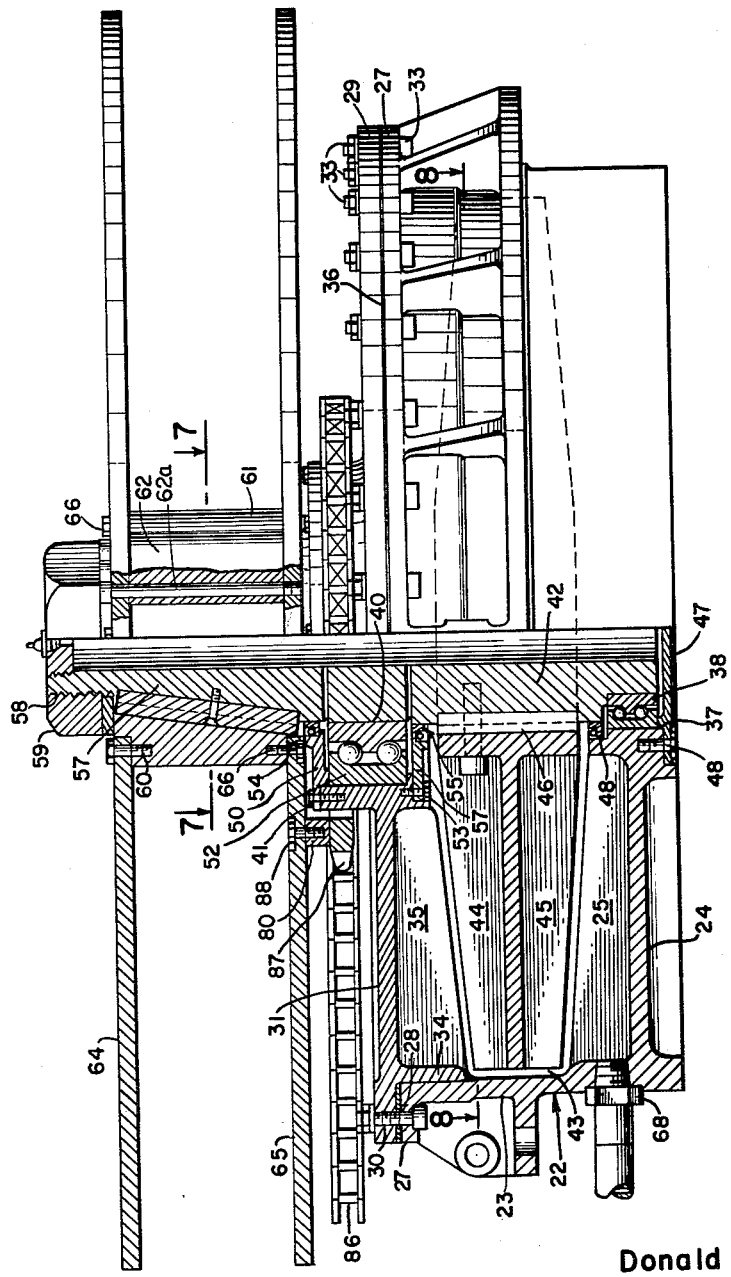
FIGURE 6 is a partial cross section view of an embodiment of the energy absorber, illustrating the association and mountings for the several parts thereof.
Figure 7:
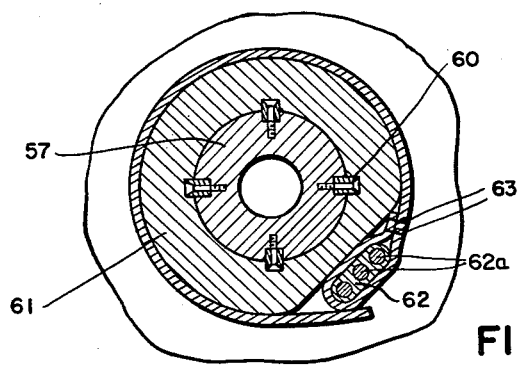
FIGURE 7 is a cross section view taken along section line 7—7 of FIGURE 6.
Figure 8:
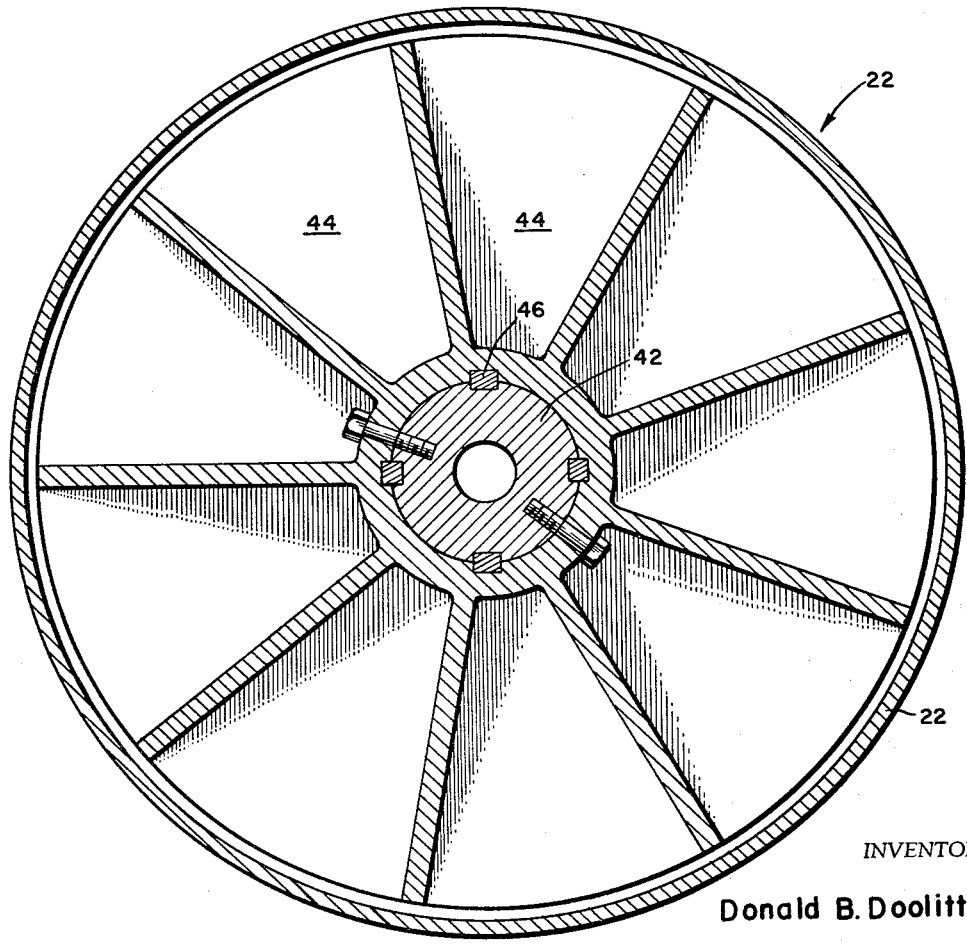
FIGURE 8 is a cross section view taken along section line 8—8 of FIGURE 6.

When repeated rapid cycling operations are required, the unit may be coupled by coupling connections 68 and 69, see FIGURES 4, 5 and 6, with conduits 70 and 71, which connect to a fluid circulating pump 72. This pump 72 may be driven by the retrieve engine D and the fluid is recirculated through the arresting unit or energy absorber and the heat exchanger 73 associated with the pump 72.

In FIGURES 4 and 5, there is shown a tape turning bar 75. This bar is secured to the supporting base for the energy absorber unit housing and extends around the circumference of the tape payout quadrant a short distance from the tape drum perimeter to lift the tape during retrieve operations. This lifting action facilitates winding or rewinding of the tape 10 on the storage reel or drum during retrieving after an arrest of an aircraft and centers the tape on the core 62 to thereby prevent loading the bottom plate 65 of the drum and prevents tape slump on the drum.

*Tape retrieving and pretensioning mechanism*

Following each arrestment operation of the energy absorber members, the tape must be rewound onto the tape drum 61. This retrieving operation may be manual or by a power driven retrieving mechanism; such as generally referenced by the letters D and E, see FIGURES 1, 2, 4 and 5. The retrieve mechanism may comprise any suitable power means, such as a gasoline engine D with a drive shaft 81 with a clutch means 82. This clutch drive connects to a gear reduction unit 83 from which vertically extends a power takeoff shaft 84 and sprocket wheel 85, see FIGURE 4.

The sprocket wheel 85 has reeved around the same a drive chain 86, which goes to and around a relatively large sprocket wheel 87 secured by means, such as bolts 88 and a spacer ring 80 formed around a face of the wheel 87, to the underside of the tape drum disk 65, see FIGURE 6 and FIGURE 4.

The engine D serves the dual function of retrieving and pretensioning. For example, the engine D is provided with suitable starting and reversing means, not shown, and the engine is preferably manually declutched from the gear reduction unit during an arrest. The pretensioning arrangement provides suitable brake means such as a friction brake 89, see FIGURE 9, for maintaining a predetermined load on the arrest cable or deck pendant 14 prior to an arrest. This pretensioning or loading of the arrest cable 14 prevents the whip-lash action of a slack cable from damaging aircraft passing over the same and materially improves the cable dynamics. The pretension brake mechanism may be released manually or automatically at a predetermined load. The pretension mechanism may be devised to automatically reset itself or be manually controlled during the retrieve operation and the same may be manually adjusted to provide for its predetermined release, however, the details of such mechanism is to be described and claimed in detail in a subsequently filed patent application.

*Mounting bases and anchoring means*

The energy absorber units and the retrieve mechanisms are supported on flat base members, such as mounting pallets 115 and 116, respectively, see FIGURES 4 and 5. These mounting pallets may be ground anchored by suitable means, such as elongated spikes 117 and in some instances may be molded into cement binding material poured into holes around the spike shanks.

Embodiment two

Figure 10:
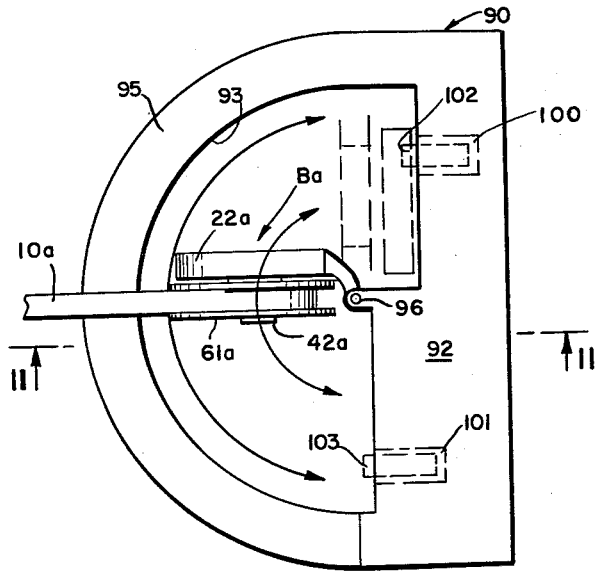
FIGURE 10 is a top plan view of a second embodiment of the present invention energy absorber.
Figure 9:
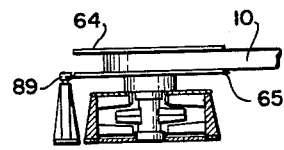
FIGURE 9 is a cross section view of the energy absorber including an elevation view of a friction brake means for pretensioning the tape and arrest cable.

FIGURES 9 and 10 illustrate a second embodiment of the energy absorber and illustrate an installation positioned flush with a suitable landing surface. In this flush mounting arrangement, the reel associated with energy absorber means is mounted in a concrete box 90 open at the top formed with a metal grid reinforcement 91 embedded therein. The box 90 is sector-shaped and comprises a solid rear wall 92 joined at each end to the ends of an arcuate front wall 93. The top peripheral edge 94 of the arcuate front wall is rounded and covered with a rub block 95 over which passes the tape 10a as it reeves off of the energy absorber unit Ba.

This unit Ba has a companion energy absorber as in embodiment one, and is pivoted on a vertical hinge structure 96, whereby the casing 22a thereof swings in a horizontal arcuate path about the hinge in response to directional loads on the tape. Thus the absorber unit 22a is swiveled, so that the tape follows the direction of payout.

The box 90 is provided with a cover 98 pivoted by the hinge 99 at the top of the straight rear wall 92 of the box, and this cover will support aircraft loads in the event an aircraft wheel or the like passes over the same.

The rear wall 92 of the box 90 is formed with depressions or sockets 100 and 101 to mount suitable shock absorbers 102 and 103. These shock absorbers serve to prevent damage to the absorber unit, if excessive swivel action is encountered during an arrest. The energy absorber unit Ba is identical to the unit of embodiment one, and includes the same tape drum 61a and the same rotor mechanism 43 keyed with a rotor shaft 42a.

Embodiment three

Figure 11:
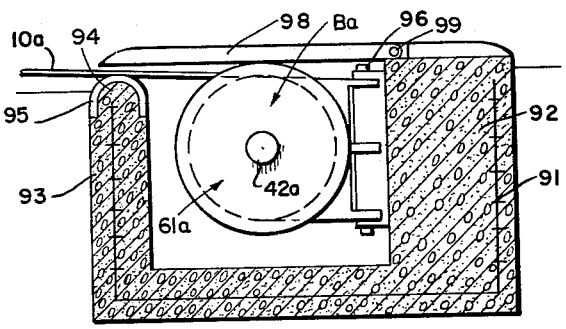
FIGURE 11 is a cross section view taken on the line 11—11 of FIGURE 10.
Figure 12:
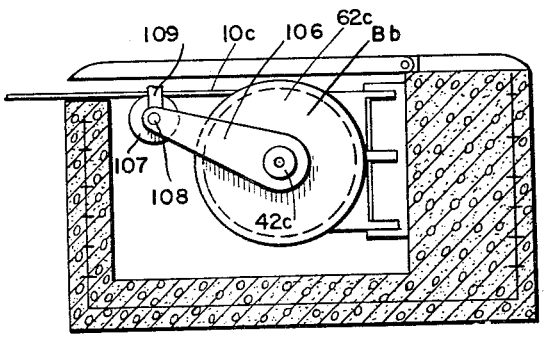
FIGURE 12 is a vertical cross section view of a third embodiment, which is an alternative form of the arrangement illustrated in FIGURES 9 and 10.

FIGURE 12 illustrates a slightly different tape payout arrangement from the energy absorber unit Bb mounted in a similar flush installation to FIGURES 10 and 11. In this third embodiment the rub block 95 is replaced by an arm 106 secured to the end of drive shaft 42c. On the end of this arm is a roller 107 journalled to revolve on an axle pin 108. The tape 10c pays off of the tape drum 62c in the direction of load over the roller, through a tape guide strip 109 and over the edge of the arcuate front wall of the box as directional loads are applied to the tape. This elimination of the rub block of FIGURES 10 and 11 reduces resulting wear and tear on the tape.

Embodiment four

Figure 13:
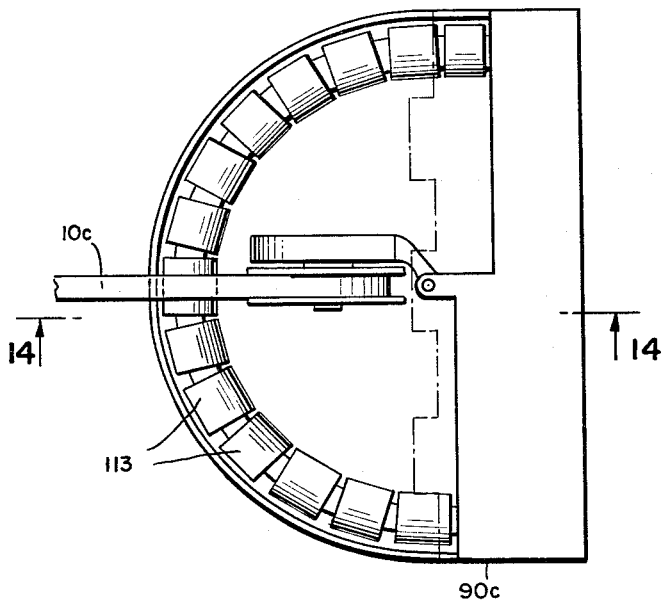
FIGURE 13 is a plan view of a fourth embodiment of the present invention energy absorber.
Figure 14:
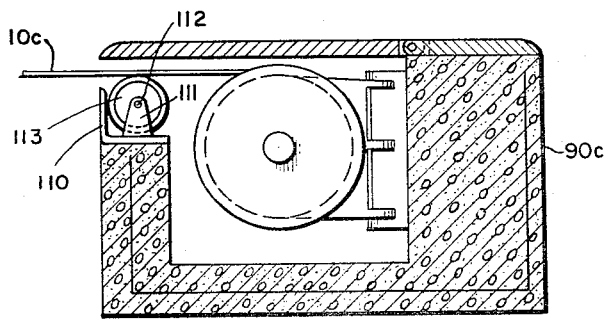
FIGURE 14 is a vertical section view taken along the section line 14—14 of FIGURE 13.

Another embodiment of the flush mounted swivel form of energy absorber is shown in FIGURES 13 and 14. In this fourth embodiment of the invention, the structural parts are identical to embodiments two and three, except that a plurality of roller brackets 110 with roller supporting lugs 111 are mounted around the arcuate peripheral edge of the front wall of the flush installation. These lugs 111 include axle pins 112 to journal anti-friction means, such as rollers 113 around the arcuate edge of the box 90c, as shown in FIGURES 13 and 14. Accordingly, as in the second and third embodiments, the tape 10c pays out from the energy absorber drum responsive to directional load over the respective peripheral surfaces of the rollers in the direction of tape payout from the box or pit 90c to reduce wear and tear on the tape.

Operation

From the foregoing the operation of the energy absorber is believed obvious. For example, briefly summarizing a normal operation, as the arrest cable or deck pendant 14 is engaged by the hook equipped aircraft as shown in FIGURE 3, the arresting tape 10 is pulled from the tape storage drum 61 and the aircraft is decelerated by the action of the rotor housed in container 22.

This tape, which is preferably nylon tape, as it unwinds revolves the rotor 43 with respect to the stator blades 25 and 35 on each side of the rotor blades 44 and 45 in the container 22. As this occurs fluid flow within the container is primarily in an outward direction from the center drive shaft toward the peripheral edge of the rotor blades, and, after turning 180 degrees near the outside diametrical edge thereof, flows back toward the hub or drive shaft 42 between the startor blades 25 and 35. This flow, along with turbulence within the flow pattern, develops torque at the shaft 42 which is transmitted to the tape drum 61.

It is possible to predict the performance curves of the energy absorber unit; namely, for example, tension-payout and aircraft hook-load and runout curves for different size energy absorber units. These performance curves may be developed from:

(1) The torque developed by the rotor,
(2) The radius to the nylon tape 10 as it is wrapped on the drum 62.
(3) The thickness of the tape webbing or change in the radius of the webbing as it pays out.
(4) The tape may be tapered in transverse section or it may be programmed in stepped down sections, for example, at fifty (50) foot intervals.

By changing these parameters suitable performance characteristics can be positively obtained for various ranges of aircraft weights and engaging velocities using a given landing surface span and aircraft runout distance.

After the aircraft arresting hook 21 is disengaged from the arresting cable 14, the retrieve engine D is clutched in and the nylon arresting tape 10 is rewound on the storage drum 61 to make the same ready for another aircraft arrest operation. During the retrieving of the tape by rewinding the same on the drum 61 the turner bar 75 is mounted on the pallet member, but during each aircraft arrestment operation this turner bar 75 is removed.

The bi-directional ability of this arrest installation provides for rapid cycling and when rapid cycling is required, the cooling system including the heat exchanger 73, pump 72 and the coolant conveying conduits 70 and 71 are utilized during retrieving to prevent overheating of the fluid in the energy absorber units.

As briefly referred to hereinbefore, the fluid used can vary in density, for example, water in summer and an anti-freeze solution, such as an ethylene glycol solution in winter.

Thus there is provided a simplified aircraft arresting gear which is very efficient in action and which action is positively predictable for the best results, when location, climate or temperature conditions and when aircraft weights, engaging velocities, thrust, arrest cable deck span and aircraft runout are known.

Without further description it is believed that the advantages of the present invention over the prior art is apparent and while only four embodiments of the same are illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. An energy absorber unit comprising a container, liquid in said container, a drum rotatable over the container, a tape wrapped, upon itself, around said drum in a single spiral, rotary drag means in said container having a shaft with an extended hub portion, said drum being keyed to said hub portion, said single spiral of tape during unwinding thereof from the drum rotating said drum and the said rotary drag means so as to control the torque developed by said drum and said drag means, and retrieving means drivably connected to said tape drum to reversely rotate the said drum, effecting rewind of the tape thereon after unwinding.

2. An energy absorbing unit as described in claim 1, wherein the said retrieve mechanism comprises an engine with a gear reduction unit, a clutch between the engine and said gear reduction unit, and a chain and sprocket drive from said gear reduction unit to said tape drum.

3. Energy absorbing means for mounting adjacent a landing surface comprising a tape, a tape drum with a core, said tape being wrapped on said core, upon itself, in a single spiral, an aircraft arresting cable coupled to the free end of said tape extending from the circumference of the spiral of tape on the drum, said cable being engageable with landing aircraft, a rotary brake means including a housing containing liquid; said housing having radially projecting stator blades secured to opposite walls thereof, a rotor with radial vanes between said stator blades, a rotor shaft to which said vanes are secured, said shaft being journalled for rotation in said housing and extending through the same, said tape drum being keyed to an extension of said shaft externally of the housing, to thereby rotate said shaft when said drum is rotated by progressive unwinding of said tape from the circumference of the spiral of tape thereon, the radius arm of said tape from the core of said drum controlling the torque developed by said radial vanes of the rotary brake means as the liquid in said housing is displaced.

4. Means for arresting mobile objects having an object arrest cable and comprising an energy absorber having a rotatable fluid immersed rotor, a housing for holding fluid enclosing said rotor, a rotor shaft extending through said housing, said housing having a top and a bottom wall, said top and bottom walls having a predetermined number of oppositely facing stator blades, said rotor being formed with a predetermined number of oppositely facing rotor blades, said rotor shaft having a hub portion extending beyond the top wall of said housing, a tape storage drum keyed to said hub portion, said tape wrapped around said storage drum having a free end connectable with the arrest cable, said tape being pulled out according to the load resulting from the weight and velocity of a mobile object imparted to the free end of said tape as said object engages said arrest cable, said number of stator blades being different from the said number of rotor blades to minimize beat effect during operation.

5. Means for arresting mobile objects having an object arrest cable and comprising an energy absorber having a rotatable fluid immersed rotor, a housing for holding fluid enclosing said rotor, a rotor shaft extending through said housing, said housing having a top and a bottom wall, said top and bottom walls having oppositely facing stator blades, said rotor being formed with oppositely facing matched rotor blades, said rotor shaft having a hub portion extending beyond the top of said housing, a tape storage drum keyed to said hub portion, and tape wrapped around said storage drum upon itself in a single spiral and having a free end connectable with the arrest cable, said tape being pulled out radially from said drum according to the load resulting from the weight and velocity of a mobile object imparted to the free end of said tape as said object engages said arrest cable so as to control the braking effect of the energy absorber, a retrieve engine, a gear reduction unit, a clutch between said gear reduction unit and said retrieve engine, a power take-off sprocket from said gear unit, a relatively larger sprocket wheel secured to said tape drum, and a drive chain reeved around said sprocket wheels adapted to rotate said tape drum to rewind said tape when said clutch is engaged.

6. Means for arresting mobile objects as described in claim 5, wherein said retrieve engine includes means to pretension said arrest cable.

7. An energy absorber unit comprising a drum, a tape wrapped around said drum, a rotary fluid brake means having a shaft with an extended hub portion, said drum being keyed to said hub, said tape during unwinding thereof from the drum thereby rotating said drum and the said rotary brake means, whereby torque from said brake means is applied from said brake to said tape drum to resist the unwinding of said tape from the drum, said energy unit being pivotally mounted in a box having an arcuate front wall and a rear wall, said box being securely mounted in the ground, said unit being pivoted to the rear wall of the box, said pivot comprising a hinged bracket, whereby said unit swivels in said bracket in the direction of tape payout over the front edge of the front wall of the box as the tape unwinds from the tape drum.

8. An energy absorber unit as described in claim 7, wherein the arcuate front wall of the box has anti-friction means on the top edge thereof to reduce wear and tear in the tape as it pays out thereover.

9. An energy absorber unit as described in claim 8, wherein the said anti-friction means are rollers.

10. An energy absorber unit comprising a tape, a tape drum around which said tape is wrapped, a rotor in a fluid filled housing, a rotor shaft for said rotor, said shaft having a hub portion, said tape drum being keyed to said shaft and adapted to impart rotation to said shaft and said rotor as the tape is unwound from said drum, said unit being mounted in a second housing having a front wall flush with a landing surface over which the tape unwinds, said unit being vertically pivoted to the rear wall of said second housing, and an arm on an end of said shaft adjacent the tape drum extending toward the top edge of said front wall, a guide roller carried by the free end of the arm, and a tape guide around the upper periphery of said roller through which said tape moves during payout thereof from the tape drum.

11. A bi-directional aircraft arresting installation for a landing surface including energy absorber means installed adjacent each side of said landing surface, said absorber means each comprising a rotatable hydraulic drag comprised of a liquid filled container, a shaft and radial drag vanes on the shaft in the container, a drum operatively connected to an extended end of said shaft, a tape wrapped around said drum upon itself in a single spiral, said tape of each drum having a free end extending toward each side of said runway, and an arresting cable connected at each opposite end to a respective free end of one of said tapes extending from each respective drum on each side of the landing surface, whereby said arrest cable transversely spans said landing surface, said arresting cable when pulled over said landing surface by a landing aircraft imparting rotation through each of said tapes as said tapes unwind to each of said drums, the radius arm of said tape as it unwinds from each respective drum controlling the braking effect of the hydraulic drag developed by said radial vanes of the hydraulic drag as the liquid in said container is displaced.

12. A bi-directional aircraft arresting installation for a landing surface including energy absorber means installed adjacent each side of said landing surface, said absorber means each comprising a rotatable hydraulic drag comprised of a liquid filled container, a shaft and radial drag vanes on the shaft in the container, a drum operatively connected to an extended end of said shaft, a tape wrapped around said drum upon itself in a single spiral, said tape of each drum having a free end extending toward each side of said runway, and an arresting cable connected at each opposite end to a respective free end of one of said tapes extending from each respective drum on each side of the landing surface, whereby said arrest cable transversely spans said landing surface, said arresting cable when pulled over said landing surface by a landing aircraft imparting rotation through each of said tapes as said tapes unwind to each of said drums, the radius arm of said tape as it unwinds from each respective drum controlling the braking effect of the hydraulic drag developed by said radial vanes of the hydraulic drag as the liquid in said container is displaced, and power means clutchable into driving connection with each of said drums to reverse the rotation thereof after arrest of said aircraft motion to rewind each respective tape and pretension said arrest cable for a new arrest operation.

13. A bi-directional aircraft arresting installation for a landing surface including energy absorber means installed adjacent each side of said landing surface, said absorber means each comprising a rotatable hydraulic drag, comprised of a liquid filled container, a shaft and radial drag vanes on the shaft in the container, a drum operatively connected to an extended end of said shaft, a tape wrapped around said drum upon itself in a single spiral, said tape of each drum having the radius arm thereof extending toward each side of said runway so as to control the braking effect developed by the radial drag vanes of the rotatable hydraulic drag in the fluid filled container, and an arresting cable connected at each opposite end to a respective free end of one of said tapes extending from each respective drum on each side of the landing surface, whereby said arrest cable transversely spans said landing surface, said energy absorbers being positioned on opposite sides of said landing surface with the respective free payout ends of their respective tapes paying off from diametrically opposite sides of their respective tape drums, whereby said drums during an arrest each rotate in the same direction.

14. An energy absorber unit for decelerating a mobile load comprising a container with liquid therein, said container having top and bottom walls, stator blades projecting radially from the interior surface of each of said walls, a shaft rotatably journalled in the top and bottom walls of said container, said shaft having an end extending from within said container beyond the exterior surface of said top wall thereof, radial drag vanes on said shaft within said container adjacent said stator blades, a hub keyed on the extended end of said shaft, a drum keyed to said hub, a load engageable cable, a tape wrapped around said drum in coiled layers, said tape having a free end extending from the top coiled layer thereof for connection with said load engageable cable, said tape unwinding when said load engageable cable is moved by an engaging mobile load, said tape during unwinding reducing the radius of said coiled layers on the drum, thereby imparting a programmed rotation to the drum, said shaft and the radial vanes on the shaft, said vanes displacing liquid within the container wtih respect to said radially projecting stator blades, whereby said rotation of said drag vanes in the liquids provides a programmed drag resistance to the rotation of said shaft and said drum and resists the unwinding of said tape therefrom.

15. An energy absorber unit for decelerating a mobile load as described in claim 14, wherein said tape is elongated nylon webbing.

16. An energy absorber unit comprising a container, liquid in said container and a drum rotatable over the container, a tape wrapped, upon itself, around said drum in a spiral and rotary drag means in said container having a shaft with an extended hub portion, said drum being keyed to said hub portion, said single spiral of tape, during unwinding thereof from said drum, progressively reducing the radius of said single spiral, thereby rotating said drum and said rotary drag means, through a progressively varying radius arm so as to control the torque developed by said drum and said rotary drag means.

References Cited by the Examiner
UNITED STATES PATENTS

| | | | |
|---|---|---|---|
| 1,992,911 | 2/35 | De La Mater | 188—90 |
| 2,419,372 | 4/47 | Schneider | 188—90 |
| 2,452,550 | 11/48 | Cline | 188—90 |
| 2,777,653 | 1/57 | Cotton et al. | 244—110 |
| 2,967,683 | 1/61 | Crater | 244—110 |
| 3,034,749 | 5/62 | Daniels | 244—110 |
| 3,093,352 | 6/63 | Hoffstrom | 244—110 |
| 3,142,458 | 7/64 | Byrne et al. | 244—63 |

OTHER REFERENCES

Aerospace Engineering, May 1961, pages 24, 25, 55–58.
Aircraft Engineering, November 1961, page 335.

FERGUS S. MIDDLETON, *Primary Examiner.*
MILTON BUCHLER, ANDREW H. FARRELL,
*Examiners.*